(No Model.)

T. R. WAY.
Coal Fork.

No. 234,633. Patented Nov. 16, 1880.

Witnesses
J. N. Campbell
J. C. Lathrop

Inventor
Thomas R Way

B. C. Converse Att'y

UNITED STATES PATENT OFFICE.

THOMAS R. WAY, OF SPRINGFIELD, OHIO, ASSIGNOR TO EDWIN R. HOTSENPILLER, OF SAME PLACE.

COAL-FORK.

SPECIFICATION forming part of Letters Patent No. 234,633, dated November 16, 1880.

Application filed July 26, 1880. (No model.)

*To all whom it may concern:*

Be it known that I, THOMAS R. WAY, of the city of Springfield, in the county of Clarke and State of Ohio, one of the United States of America, have invented a new and useful Improvement in Coal-Forks, of which the following is a specification.

My invention relates to coal-forks for screening slack and dust from the coal while handling.

The objects of my improvement are, first, the construction of a cheaper article; second, making it answer also the purposes of a scoop-shovel, it being made with a steel toe-piece, to which the points of the tines are fastened; third, the tines are riveted at their ends to the head and toe piece, and can be easily removed and replaced by new ones when broken. They are moreover very much lighter than ordinary tines or teeth. The head of the fork being malleable, it can be duplicated at small expense, and can be hammered into shape if bent. The shaft connecting the handle with the fork-head is made of gas-pipe, the handle being connected with it by a gas-pipe coupling. The tines of the fork are formed of sheet-steel struck up of right-angled cross-section, so as to be of greatest possible strength and lightness.

Coal-scoops have been made entirely of sheet metal and slotted or perforated for screening coal; but these take but a small quantity of slack from it, as in order to leave strength enough the holes or slots must necessarily embrace but a small portion of the superfice.

Figure 1:
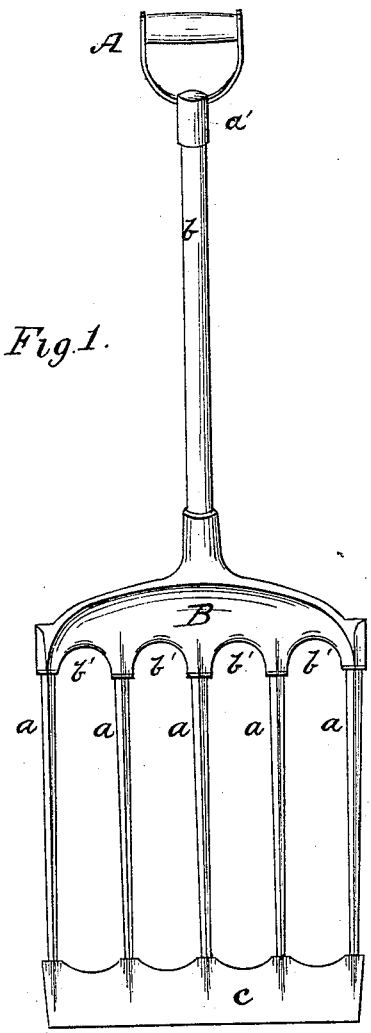
Figure 2:
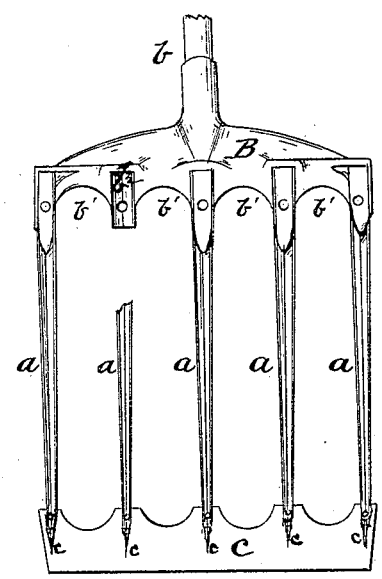
Figure 3:
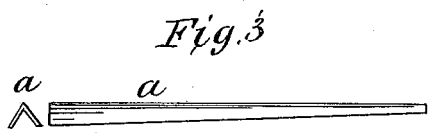

Figure 1 is a top view of my improved coal-fork; Fig. 2, a view of the under side of the same. Fig. 3 shows a cross-section of the tines.

A is the handle, made in usual form. It is attached to the top end of shaft $b$ by the gas-pipe coupling-piece $a'$. The shaft $b$ is gas-pipe, and its lower end is also threaded and screwed into the malleable head B. This latter is made light and concaved somewhat to give shape to the fork. Its lower end divides into sub-prongs $b'$, which are hollowed to receive the tines $a$, and these latter are securely fastened therein with rivets, giving to this part of the fork great strength from the reenforcement of the base of the tines by the sub-prongs. At the points of the tines a flat steel toe-piece, C, is also riveted. This toe-piece is of single-thickness sheet-steel, and is struck up to conform to the angular shape of the tines, the ends of which are laid in the indents on the under side of it and firmly secured thereto with rivets, as shown in Figs. 1 and 2, thus preventing any exposure of the tine ends to abrasion while operating the implement and making this part of the fork as durable as the other. In case a tine becomes broken or the toe-piece much worn, either or both can be replaced at a very small cost.

In repairing my improved coal-fork, the parts being wholly of metal except the handle A, (which is easily disconnected,) it can be exposed in the forge without injury, whereas with the ordinary wooden-handled fork this cannot be done until the fork is disconnected, in which case the handle is more or less injured and often must be replaced.

I claim as my improvement—

1. In a coal-fork, the head-plate B, provided with the slots $b^2$ of the sub-prongs $b'$, for the insertion of the V-shaped adjustable tines $a$, and secured thereto, substantially as shown and described.

2. In a coal-fork, the toe-piece C, struck up with indents or creases $c$ on its under face, as shown, to adapt it for connection with the point ends of the tines $a$, and secured thereto, substantially as shown and described.

THOMAS R. WAY.

Attest:
B. C. CONVERSE,
M. M. CONVERSE.